(12) United States Patent
Howard

(10) Patent No.: US 10,496,514 B2
(45) Date of Patent: Dec. 3, 2019

(54) SYSTEM AND METHOD FOR PARALLEL PROCESSING PREDICTION

(71) Applicant: Kevin D. Howard, Tempe, AZ (US)

(72) Inventor: Kevin D. Howard, Tempe, AZ (US)

(*) Notice: Subject to any disclaimer, the term of this patent is extended or adjusted under 35 U.S.C. 154(b) by 732 days.

(21) Appl. No.: 14/948,224

(22) Filed: Nov. 20, 2015

(65) Prior Publication Data

US 2016/0148102 A1    May 26, 2016

Related U.S. Application Data

(60) Provisional application No. 62/082,518, filed on Nov. 20, 2014.

(51) Int. Cl.
G06N 5/02 (2006.01)
G06F 11/34 (2006.01)

(52) U.S. Cl.
CPC .......... *G06F 11/3442* (2013.01); *G06N 5/02* (2013.01)

(58) Field of Classification Search
None
See application file for complete search history.

(56) References Cited

U.S. PATENT DOCUMENTS

| | | |
|---|---|---|
| 9,851,949 B2 | 12/2017 | Howard |
| 2008/0082933 A1 | 4/2008 | Howard et al. |
| 2009/0055625 A1 | 2/2009 | Howard et al. |
| 2010/0049941 A1 | 2/2010 | Howard |
| 2010/0183028 A1 | 7/2010 | Howard et al. |
| 2010/0251259 A1 | 9/2010 | Howard |
| 2010/0325388 A1 | 12/2010 | Howard |
| 2012/0036399 A1 | 2/2012 | Howard |
| 2012/0066664 A1 | 3/2012 | Howard |
| 2012/0101929 A1 | 4/2012 | Howard |
| 2013/0254751 A1 | 9/2013 | Howard |
| 2013/0311543 A1 | 11/2013 | Howard |
| 2013/0325750 A1 | 12/2013 | Howard |
| 2013/0325860 A1 | 12/2013 | Howard |
| 2013/0332777 A1 | 12/2013 | Howard |
| 2013/0332903 A1 | 12/2013 | Howard |

(Continued)

FOREIGN PATENT DOCUMENTS

| | | |
|---|---|---|
| WO | 2001001219 A2 | 1/2001 |
| WO | 2003060748 A2 | 7/2003 |

(Continued)

OTHER PUBLICATIONS

Pilla, Topology-Aware Load Balancing for Performance Portability over Parallel High Performance Systems, Distributed, Parallel, and Cluster Computing, Université de Grenoble, 2014, pp. 1-118 (Year: 2014).*

(Continued)

*Primary Examiner* — Wilbert L Starks
(74) *Attorney, Agent, or Firm* — Skaar Ulbrich Macari, P.A.

(57) ABSTRACT

Systems, methods, and computer program products are provided for space-time complexity speedup for computer algorithms in terms of processing time as a function of dataset size and type, showing serial, sub-linear, linear and superlinear speedup. Serial and parallel effects can be processed and calculated from a decomposed algorithm's sequential functional components, allowing the identification and use of the parallelizable components.

16 Claims, 7 Drawing Sheets

TABLE 7    SCALED TIME COMPLEXITY SEARCH

(56) References Cited

U.S. PATENT DOCUMENTS

| | | |
|---|---|---|
| 2013/0332904 A1 | 12/2013 | Howard |
| 2013/0346807 A1 | 12/2013 | Howard |
| 2014/0025430 A1 | 1/2014 | Howard |
| 2014/0068464 A1 | 3/2014 | Howard et al. |
| 2014/0125683 A1 | 5/2014 | Howard |
| 2014/0198196 A1 | 7/2014 | Howard et al. |
| 2014/0282412 A1 | 9/2014 | Howard et al. |
| 2014/0298286 A1 | 10/2014 | Howard |
| 2014/0304684 A1 | 10/2014 | Howard |
| 2014/0310678 A1 | 10/2014 | Howard |
| 2014/0310680 A1 | 10/2014 | Howard |
| 2014/0310684 A1 | 10/2014 | Howard |
| 2014/0310689 A1 | 10/2014 | Howard |
| 2014/0344773 A1 | 11/2014 | Howard |
| 2014/0372966 A1 | 12/2014 | Howard |
| 2015/0149535 A1 | 5/2015 | Howard |
| 2016/0085512 A1 | 3/2016 | Howard |
| 2016/0148102 A1 | 5/2016 | Howard |
| 2016/0188299 A1 | 6/2016 | Howard |
| 2016/0226658 A1 | 8/2016 | Howard |

FOREIGN PATENT DOCUMENTS

| | | |
|---|---|---|
| WO | 2005111843 A2 | 11/2005 |
| WO | 2012021523 A2 | 2/2012 |
| WO | 2012024435 A2 | 2/2012 |
| WO | 2013036824 A2 | 3/2013 |
| WO | 2013184952 A1 | 12/2013 |

OTHER PUBLICATIONS

Thomas J. McCabe, A Complexity Measure, IEEE Transactions on Software Engineering, vol. SE-2, No. 4, Dec. 1976, pp. 308-320.

* cited by examiner

Matrix Multiplication 100,000 x 100,000 Speedup, No Overhead $E^x$ Speedup, No Overhead Delaunay Speedup, Flip Algorithms Implementation, With Overhead Fig. 6  TABLE 7 SCALED TIME COMPLEXITY SEARCH

SYSTEM AND METHOD FOR PARALLEL PROCESSING PREDICTION

PRIORITY

This Application claims priority to and the benefit of U.S. Provisional Patent Application No. 62/082,518, filed Nov. 20, 2014, which is incorporated fully herein by reference.

TECHNICAL FIELD

The present invention relates generally to systems, methods, and computer programs for parallel processing prediction.

BACKGROUND OF THE INVENTION

Amdahl's law is named after computer architect Gene Amdahl, and is used to find the expected improvement to an overall system when only part of the system is improved. It is often used in parallel computing to predict the theoretical maximum speedup using multiple processors of a computing system. Amdahl's law is a model for the relationship between the expected speedup of parallelized implementations of an algorithm relative to the serial algorithm, under the assumption that the problem size remains the same when parallelized.

It has been argued that the speedup of a program using multiple processors in parallel computing is limited by the time needed for the sequential fraction of the program. Namely, "the effort expended on achieving high parallel processing rates is wasted unless it is accompanied by achievements in sequential processing rates of very nearly the same magnitude."

However, there can be better methods of predicting speedup than Amdahl's law which predicts that the maximum parallel speedup is linear and is dominated by serialism.

SUMMARY OF THE INVENTION

In general, the task of parallelizing a software functional component is considered much more difficult than its original coding (e.g., for a single processor). Because of this difficulty, being able to predict the effects of the parallelization on the component prior to performing the parallelization is ideal. The software, systems, and methods of the present invention provide analysis and processing of functional software components needed to: 1) determine if the component is inherently serial (cannot be parallelized) or will benefit from parallelization; 2) determine and process an estimate of the speedup obtainable for various numbers of processing elements if the functional component is parallelized; 3) determine and process an estimate of the processing time for a dataset of the given size using a given number of processing elements; 4) determine and process an estimate of the effects of overhead when a functional component can be parallelized; and 5) deliver or output this information in an easy-to-understand and usable form.

Particular embodiments of the present invention are directed to algorithmic speedup showing sub-linear, linear, super-linear, speedup. The processing time of an algorithm is given by the time-complexity of that function. It is reasonable then to assume that speedup is also given by time-complexity. Since time-complexity is not always linear, then speedup should not be linear. Thus, Amdahl's Law does not always describe speedup.

Serial, effectively serial, parallel, and serialized parallel effects can be calculated directly from the relationship between the algorithms input dataset size and its processing time, allowing for the identification of both parallelizable components and sub-components. Task-parallelism effects can be directly incorporated into space-time complexity speedup. Speedup bounding intervals can be found, allowing the effects of different dataset types to be incorporated into the speedup description. Scaled speedup is shown to be a natural extension of time-complexity speedup. The surprising result of superlinearity as intrinsic to some algorithms presents the possibility of economies of scale in high-performance computing.

The above and other aspects and embodiments of the present invention are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further explain the principles of the disclosure and to enable a person skilled in the pertinent art to make and use the embodiments disclosed herein.

In the drawings, like reference numbers indicate identical or functionally similar elements.

FIG. 6 shows a table of a scaled time complexity search, in accordance with embodiments of the present invention.

DETAILED DESCRIPTION OF PREFERRED EMBODIMENTS

Figure 1:
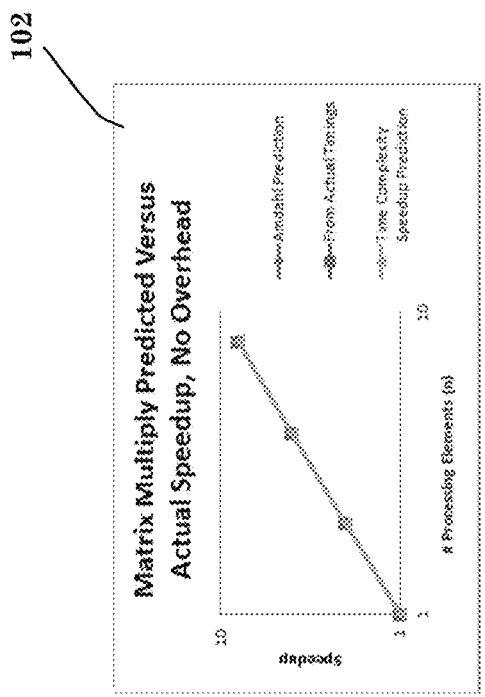
FIG. 1 shows a matrix multiplication versus actual speedup (no overhead) comparison graph, in accordance with embodiments of the present invention.

Referring generally to FIGS. 1-10, exemplary systems, methods, interfaces, and graphs related to better predictions of parallel processing are provided. Various devices or computing systems can be included and adapted to process and carry out the aspects, computations, and algorithmic processing of the software system of the present invention. Computing systems and devices of the present invention may include a processor, which may include one or more microprocessors and/or one or more circuits, such as an application specific integrated circuit (ASIC), field-programmable gate arrays (FPGAs), etc. Further, the devices can include a network interface. The network interface is configured to enable communication with a communication network, other devices and systems, and servers, using a wired and/or wireless connection.

The devices or computing systems may include memory, such as non-transitive, which may include one or more non-volatile storage devices and/or one or more volatile storage devices (e.g., random access memory (RAM)). In instances where the devices include a microprocessor, computer readable program code may be stored in a computer readable medium or memory, such as, but not limited to magnetic media (e.g., a hard disk), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described above and herein. In other embodiments, the device is configured to perform steps described herein without the need for code.

It will be recognized by one skilled in the art that these operations, algorithms, logic, method steps, routines, subroutines, and modules may be implemented in software, in firmware, in special purpose digital logic, and any combination thereof without deviating from the spirit and scope of the present invention as recited within the claims attached hereto.

The devices or computing devices may include an input device. The input device is configured to receive an input from either a user (e.g., admin, user, etc.) or a hardware or software component—as disclosed herein in connection with the various user interface or automatic data inputs. Examples of an input device include a keyboard, mouse, microphone, touch screen and software enabling interaction with a touch screen, etc. The devices can also include an output device. Examples of output devices include monitors, televisions, mobile device screens, tablet screens, speakers, remote screens, etc. The output device can be configured to display images, media files, text, or video, or play audio to a user through speaker output.

Server processing systems for use or connected with the systems of the present invention, can include one or more microprocessors, and/or one or more circuits, such as an application specific integrated circuit (ASIC), field-programmable gate arrays (FPGAs), etc. A network interface can be configured to enable communication with a communication network, using a wired and/or wireless connection, including communication with devices or computing devices disclosed herein. Memory can include one or more non-volatile storage devices and/or one or more volatile storage devices (e.g., random access memory (RAM)). In instances where the server system includes a microprocessor, computer readable program code may be stored in a computer readable medium, such as, but not limited to magnetic media (e.g., a hard disk), optical media (e.g., a DVD), memory devices, etc.

Amdahl's Law predicts that the maximum parallel speedup is linear and is dominated by serialism. However, the present invention applies software processing to determine that that strong scaling is better predicted by space-time complexity speedup. A method for determining which decomposed functional components of an algorithm benefit from parallelization is disclosed. Overhead is shown to be separate from serialism. Overhead can include resources—memory, bandwidth, CPU time, etc.—required to reach an intended result in computing. It may not contribute to the final goal or product, but is required as a result of the technology or processing method. The effect of overhead on total processing time can outweigh the effect of time complexity, which in turn outweighs the effect of serial performance. Scaled speedup (or serialized parallel speedup) is shown to be a natural part of strong scaling.

INTRODUCTION

Strong scaling is considered to be dominated by the serial fraction of the total processing time of an algorithm as shown in Amdahl's Law, generally stated as (parenthetical numbers proximate equations denote equation reference numbers herein):

$$S(n) = \frac{1}{(1-p) + \frac{p}{n}} \quad (1)$$

where p=parallel fraction of processing time, n=number of processing elements, and (1−p)=serial fraction of processing time.

Examining speedup without serialism means p=1, which is considered maximum speedup:

$$S_n = \frac{t_1}{t_n} \Rightarrow S(n) = \frac{1}{\frac{1}{n}} = n \quad (2)$$

where $t_n$=processing time for an algorithm with an input dataset distributed evenly across n processing elements.

From equation (2), it can be seen that Amdahl's Law leads to an assumption of linearity as the best case. However, this is assumption is tested and analyzed herein. Typically, the overhead-processing time of a parallelized algorithm is included as a part of that algorithm's serial fraction. To understand an algorithm's maximum parallel-processing speedup, the serial fraction must first be eliminated. With data parallelism, an algorithm's workload per processing element (PE) decreases as the PE count "n" increases. This decrease in workload and eliminate any hardware differences can be emulated by successively decreasing the dataset size processed by a single PE. By using a single PE and the non-parallelized version of the algorithm, varying only the input-dataset size processed, the algorithm's effective maximum performance without parallel overhead can be shown.

The matrix multiplication algorithm is chosen to test the Amdahl assumption because its behavior is understood. A hand-written, non-parallelized version of Matrix Multiply is included for this test and is successively executed using the same PE on a 64-bit Nehelon-2 processor (Intel Xeon X5550 at 2.67 GHz). Of course, other like systems or processors can be included without deviating from the spirit and scope of the present invention. The following timings are the results of multiplying two 64-bit 2-dimensional matrices consisting of double-precision floating-point numbers (number×number), giving the average matrix multiplication time in seconds:

TABLE 1

MATRIX MULTIPLY TIMINGS, NO OVERHEAD

| Equivalent PE Count | Dataset Size | Scaled Dataset Size | Actual Time (sec.) | Scaled Time (rounded) |
|---|---|---|---|---|
| 1 | 16,000,000 | 8 | 742.204 | 8.000 |
| 2 | 8,000,000 | 4 | 371.102 | 4.000 |
| 4 | 4,000,000 | 2 | 185.551 | 2.000 |
| 8 | 2,000,000 | 1 | 92.776 | 1.000 |

FIG. 1 shows, at graph 102, the actual speedup of the Matrix Multiply along with the speedup predictions based on Amdahl's Law and on time complexity and time-complexity speedup as described in this disclosure. For Matrix Multiply, the obtained approximate time complexity T(d) is "d", where d is the input dataset size.

The matrix multiplication algorithm, as well as other standard benchmarks such as the LU, QR, and SV decompositions, have been shown to be linear using the single PE evaluation method. Is this because Amdahl's assumption of linearity is correct or is there another explanation? The present invention teaches and advances that the reason that Matrix Multiply and other standard benchmarks show linear speedup is that each algorithm's time complexity is linear.

Figure 2:
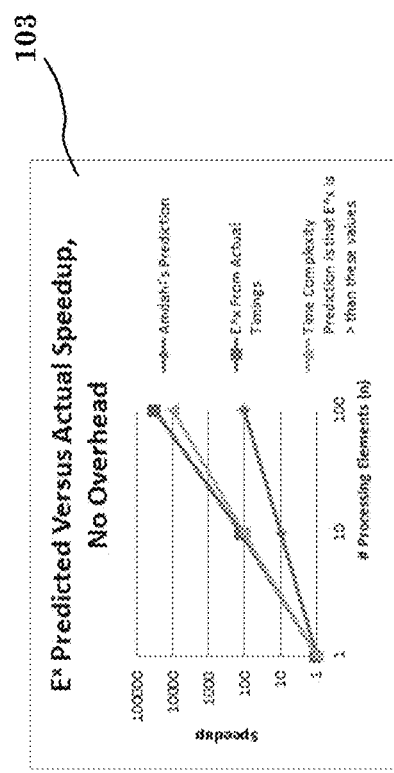
FIG. 2 shows an exponential versus actual speedup (no overhead) comparison graph, in accordance with embodiments of the present invention.

Referring to Table 2 and FIG. 2 (graph 103), another simple, well-understood algorithm is $e^x$. An arbitrary precession, Taylor-series implementation of $e^x$ (a very slow-performing implementation method not usually parallelized) was created for testing and establishing the processing of the present invention and successively executed varying the number of calculated digits of precession, a scaler input, using the setup described for Matrix Multiply.

TABLE 2

$E^X$ TIMINGS, NO OVERHEAD

| Equivalent PE Count | Digits of Accuracy | Scaled Digits of Accuracy | Actual Time (sec.) | Scaled Time (rounded) |
|---|---|---|---|---|
| 1 | 1000,000 | 100 | 42,868.609 | 32,378.103 |
| 10 | 10,000 | 10 | 341.916 | 259.027 |
| 100 | 1,000 | 1 | 1.324 | 1.000 |

The obtained approximate time complexity T(d) is "$d^2$" for $e^x$.

Figure 3:
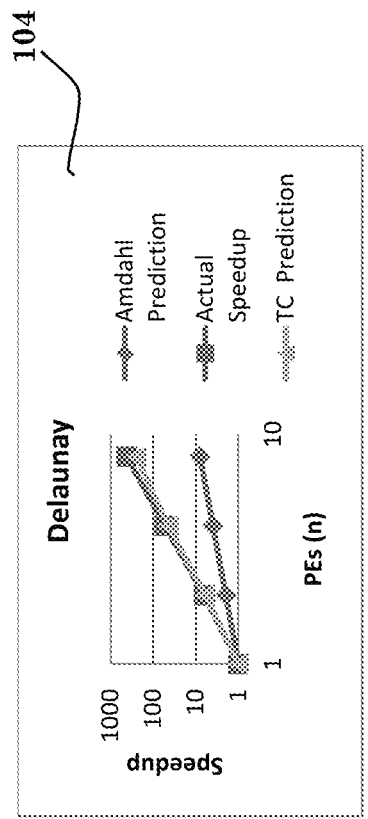
FIG. 3 shows a Delaunay speedup comparison graph, in accordance with embodiments of the present invention.
Figure 4:
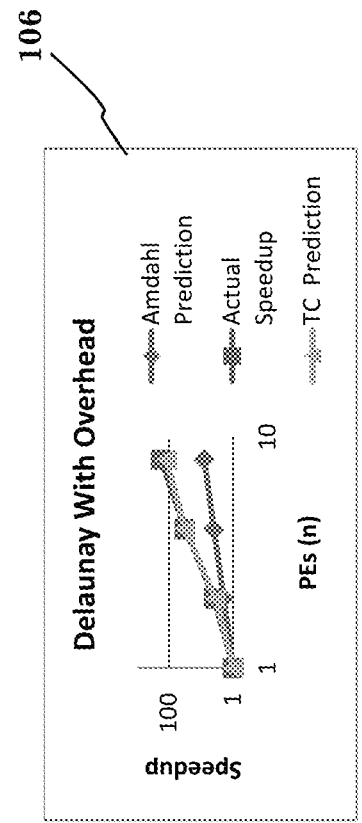
FIG. 4 shows a Delaunay (with overhead) speedup comparison graph, in accordance with embodiments of the present invention.

Referring to Table 3 and FIG. 3 (graph 104), timings for a more complex algorithm using multiple PEs is also included: a Delaunay triangulation algorithm of 2,492 source lines of code was implemented using duo-quad-core 64-bit Nehelon-2 processors, using the slow-performing flip-algorithms method, giving the following:

TABLE 3

DELAUNEY TIMINGS, NO OVERHEAD

| Actual PE Count | Dataset Size (col × rows) | Scaled Dataset Size | Actual Time (sec.) | Scaled Time (rounded) |
|---|---|---|---|---|
| 1 | 100 × 100 | 8 | 22,158.320 | 418.334 |
| 2 | 100 × 50 | 4 | 2,833.296 | 53.491 |
| 4 | 100 × 25 | 2 | 343.208 | 6.479 |
| 8 | 100 × 12.5 | 1 | 52.968 | 1.000 |

It appears that, in the absence of parallelization overhead, superlinearity is not only possible but predictable for both $e^x$ and Delaunay. If the overhead from parallelization can be minimized, the natural superlinearity of an algorithm may be made usable. Usable superlinearity means that it is possible to have economies of scale for large computing systems; multiple PEs would be less expensive to operate than using a single PE. Before the goal of usable superlinearity can be obtained, the tools for the prediction of algorithm performance with and without overhead must be created. The present invention teaches, creates, and provides these tools.

Since the processing time of an algorithm changes with its input dataset size, the concept of time complexity becomes relevant to speedup. Time complexity is the relationship of an algorithm's processing time to its input-dataset size—"big-O notation" as discussed by Paul E. Black in The Dictionary of Algorithms and Data Structures.

The larger the time complexity, the longer it takes to process a dataset of size "d". However, given a dataset of size "d/n" where d/n≠1 and n>1, the larger the time complexity, the shorter the processing time. For example, two algorithms with different time complexity functions T(d)=d and T'(d)=$d^2$ are compared. Substituting "d/n" for "d" gives T(d/n)=d/n and T'(d/n)=$d^2/n^2$. If d=2 and n=3, then T(⅔)= 0.667 and T'(⅔)=4/9=0.444, showing that the algorithm with the larger time complexity has the shorter processing time.

The one exception to the performance inversion of "d/n" compared to "d" for time complexity is when the larger time complexity is a constant multiple "a" of the smaller time complexity and a>1. For example, two algorithms with different time complexity functions T(d)=d and T'(d)=ad are compared. Substituting "d/n" for "d" gives T(d/n)=d/n and T'(d/n)=ad/n. If d=2, n=3, and a=3, then T(⅔)=0.667 and T'(⅔)=2, showing that the algorithm with the larger time complexity has the longer processing time.

As shown with the matrix multiplication and $e^x$ algorithms herein, the Amdahl relationship of $t_n=1/n$ in equation (2) appears to hold only if the time complexity of the algorithm is T(d)=d or, in terms of "big-O notation", O(d); that is, the algorithm processing time changes linearly with input-dataset size "d", which is not always the case. Using time complexity instead of time in a speedup equation shows that, with the noted exception, the greater the time complexity, the greater the speedup.

Strong Scaling Speedup

If a dataset is evenly distributed across n PEs such that the processing time on each PE is equivalent, the dataset size can represent processing time, which is used to measure algorithmic work, using time complexity (TC). In representing the relationship between an algorithm's input-dataset size and processing time, TC can be used to find speedup. In representing how much faster a dataset can be processed per n in parallel as n increases, as long as the parallel processing time is equivalent on each n, speedup can also be viewed in terms of the relationship between dataset size and the algorithm's processing performance.

The general TC function T(d) gives processing time at n=1, $T(d_1)=t_{d1}$. Evenly distributing initial dataset $d_1$ across n PEs, $d_1/n=d_n$, gives processing time per n at each n, $T(d_n)=t_{dn}$. The TC of the scaled input dataset size, $T(d_1/d_n)$, gives scaled processing time, $t_{d1}/t_{dn}$. Each $d_n$ in Table 1 through Table 3 is scaled by the smallest observed $d_n$, called $d_{min}$, and each $t_{dn}$ is scaled by the fastest observed processing time, called $t_{min}$, associated with that smallest observed $d_n$.

Speedup is the ratio of some initial processing time, $t_{d1}$, at initial dataset size $d_n$ where n=1 to some new processing time, $t_{dn}$, at some $d_n$ where n>1, $S(n)=t_{d1}/t_{dn}$. Processing time in equation (3) below is replaced by the TC function of the parallel fraction of the algorithm, $T_p(d)$, to find speedup.

Given $d_1/n=d_n$ as above, then $n=d_1/d_n$. Thus, n can be thought of as a scaled dataset size, not just the number of processing elements. Scaling $d_n$ by itself means $T_p(d_n/d_n)=T_p(1)=1$ scaled time unit.

$$S(n) = \frac{t_{d_1}}{t_{d_n}} = \frac{\left(\frac{t_{d_1}}{t_{d_n}}\right)}{\left(\frac{t_{d_n}}{t_{d_n}}\right)} = \frac{T_p\left(\frac{d_1}{d_n}\right)}{T_p\left(\frac{d_n}{d_n}\right)} = \frac{T_p(n)}{T_p(1)} = T_p(n) \quad (3)$$

Equation (3) shows the maximum theoretical speedup in terms of the TC function of the parallel time fraction at n.

Processing Time Finding a processing time for a dataset, $d_{1\text{-}new}$, processing on n PEs first requires scaling $d_{1\text{-}new}$ by $d_{min}$, $g=d_{1\text{-}new}/d_{min}$, representing the number of groups, g, of the minimum observed dataset size, $d_{min}$. Next the groups are spread evenly across the n PEs, g/n. The time complexity of g/n is found, T(g/n), giving scaled time. Finally, the scaled time is multiplied by the smallest observed unscaled processing time, $t_{min}$. Thus:

$$t = T\left(\frac{\left(\frac{d_{1\text{-}new}}{d_{min}}\right)}{n}\right) t_{min} = T\left(\frac{g}{n}\right) t_{min} \quad (6)$$

Processing Serialized Parallel Performance

In Table 1 through Table 3, there is a special circumstance when n equals g, giving $T_p(g/n)=T_p(1)=1$ scaled time unit. The processing time under these circumstances is $t_{min}$ for any dataset size. Thus, the maximum processing performance can be maintained by adjusting n so that it always equals g. Because the processing time is 1 for any dataset size, this condition acts as if the TC were serial and so is called serialized parallel performance (Table 4 below).

TABLE 4

SERIALIZED PARALLEL PERFORMANCE

| Algorithm | Scaled Dataset Size ($d_{init}$) | # of PE (d) | Scaled Processing Time |
|---|---|---|---|
| Matrix Multiply | 8 | 8 | 1 |
| $e^x$ | 100 | 100 | 1 |
| Delaunay | 8 | 8 | 1 |

Processing Types

The following are the processing types:

$((d_1 > d_n) \wedge (T(d_n) < T(d_1))) \Rightarrow$ parallel (7)

$((d_1 \neq d_n) \wedge (T(d_1) = T(d_n))) \Rightarrow$ serial $((d_1 > d_n) \wedge (T(d_n) > T(d_1))) \Rightarrow$ effectively serial $T_p\left(\frac{g}{n}\right) = 1 \Rightarrow$ serialized parallel A complex algorithm can be decomposed using McCabe's linearly independent pathway determination methods or composite-function decomposition methods into components, allowing each functional component (FC) to be separately tested using the method for finding TC ("Communication Channels For Overhead Serialized Parallelism Example" of the present disclosure) and found to be serial, part serial/part parallel (mixed), or parallel by equation (7).

FCs can be linked with the output of one FC being the input of a following FC. If there is some FC whose inputs are not the outputs of some proceeding FC then that FC can be executed in parallel with the proceeding FC. This is called component-level parallelism and can be used with serial, mixed, or parallel FCs.

For the FCs of the algorithm that are determined to be serial, the serial TC functions are summed:

$$s = T_s(d_1) \cong T_1(d_1) + T_2(d_1) + \ldots + T_a(d_1) = \Sigma_{i=1}^{a} T_i(d_1) \quad (8)$$

where i=the current serial FC and a=the count of all serial FCs.

For the FCs of the algorithm that are determined to be parallel, the parallel TC functions are summed:

$$T_p(n) \cong T_1(n) + T_2(n) + \ldots + T_b(n) = \Sigma_{j=1}^{b} T_j(n) \quad (9)$$

where j=the current parallel functional component and b=the count of all parallel FCs.

For each FC that is mixed serial and parallel, the TC is composed of the serial portion and the parallel portion:

$$T\left(\frac{d_1}{d_n}\right) = T_s(d_1) + T_p\left(\frac{d_1}{d_n}\right) = s + T_p(n) \quad (10)$$

For example if the TC of an FC is found to be $n^2 \log_2 n + 2$, then $T_p(n) = n^2 \log_2 n$ and s=2.

The serial TC from all mixed FCs is added to serial TCs from all serial FCs of an algorithm, and the parallel TCs from all mixed FCs is added to the parallel TCs from all FCs determined to be parallel.

Taking the limit of the number of PEs shows that speedup grows without bound even with serialism.

$$\lim_{n \to \infty}(s + T_p(n)) = \infty \quad (11)$$

Compare this to the limit of Amdahl's law which shows that the maximum speedup is the reciprocal of the serial fraction.

$$\lim_{n \to \infty}\left(\frac{1}{(1-p) + \frac{p}{n}}\right) = \frac{1}{1-p} \quad (12)$$

Overhead Time Complexity

The additional time introduced from parallelization generally increases as n increases and dataset size decreases and, therefore, can be described using the TC of the overhead.

Using a list of scaled overhead timings associated with scaled overhead dataset sizes, the speedup of overhead, T(n), can be found with the methods shown in the "Finding Time Complexity Functions" Section of the present disclosure.

$$S(n) = \frac{s + T_p(n)}{T(n)} \quad (13)$$

Since overhead can be viewed using TC, serial and parallel overhead is possible. Extracting the serial overhead terms from overhead time complexity gives the serial overhead time $s_o$, plus the parallel overhead TC function $T_o(n)$ and changes equation (13) to for the present invention:

$$S(n) = \frac{s + T_p(n)}{s_o + T_o(n)} \quad (14)$$

Like standard processing, overhead can also have serialized parallelism, making overhead a constant. Since $T_o(n)$ represents the scaled cross communication time, which is equivalent to the number of communication steps. If c represents the number of communication channels per PE, then overhead serialized parallelism is the special condition where the minimum data transfer occurs, that is when $T_o(n)=c$, the minimum cross communication time—See "Communication Channels For Overhead Serialized Parallelism Example" Section of the present disclosure.

Component level parallelism cannot have overhead because no parallel related time is changed, only a rearrangement of existing timings, masking some or all of these timings.

Standard overhead can now be calculated for Delaunay Triangulation.

TABLE 5

DELAUNAY OVERHEAD

| Actual PE Count | Dataset Size (col × rows) | Scaled Dataset Size | Actual Time (sec.) | Scaled Time (rounded) |
|---|---|---|---|---|
| 1 | 100 × 100 | 8 | 10.016 | 2.590 |
| 2 | 100 × 50 | 4 | 5.369 | 1.388 |
| 4 | 100 × 25 | 2 | 3.867 | 1.000 |
| 8 | 100 × 12.5 | 1 | 0.000 | 0.000 |

Using Table 5 and the methods of the "Finding Time Complexity Functions" and "Example—Finding Delaunay Overhead" Sections of the present disclosure, $T_o(n)$ is found. From equation (3), the theoretical maximum overhead speedup for the Flip Algorithms implementation of Delaunay Triangulation as $T_o(n)$ @ $\log_e n$.

From equation (13), the complete Delaunay speedup is now given as: $S(n)$ ($n^2 \log_2 n+n(n-1))/\log_e n$.—see FIG. 4.

Complete Serialized Parallelism, Speedup

When overhead serialized parallelism is combined with processing serialized parallelism, the following is found:

$$S_{min}\left(\frac{g}{n}\right) = \frac{s + T_p(1)}{s_o + T_o(2)} = \frac{s+1}{s_d + t_{o,2}} \quad (15)$$

Where n=g, $t_{o,2}$=cross communication time between two Pes.

From equation (15) performance is a single processing event plus a single overhead event regardless of the dataset size. Unlike Gustafson's law, which is useful for only very large dataset sizes, equation (15) can be used with any valid dataset size with the present invention.

Communication Channels for Overhead Serialized Parallelism Example

For equation (15) to be viable requires a method of balancing data transfer time steps with communication channels. The method below produces enough communication channels for the data transfer steps when the PEs are attached via either cache or RAM, using a pool of channels with associated threads. A worst-case communication model is the all-to-all exchange moving the full dataset between PEs, that is, $T_o(n)=n(n-1)$, shown in FIG. 5. In this model, each pair of PEs is attached using two memory-based communication channels and is represented by two blocks of memory: the data flag block and the data transfer block. To access the data transfer block requires its starting address and size. Since the maximum data moved between a pair of PEs is all of the data contained in the transmitting PE, the maximum data transfer block size is $d_n$. The maximum number of data transfer blocks per PE, b, is the number of PEs that could be in communication with the current PE; that is, b=n−1.

Figure 5:
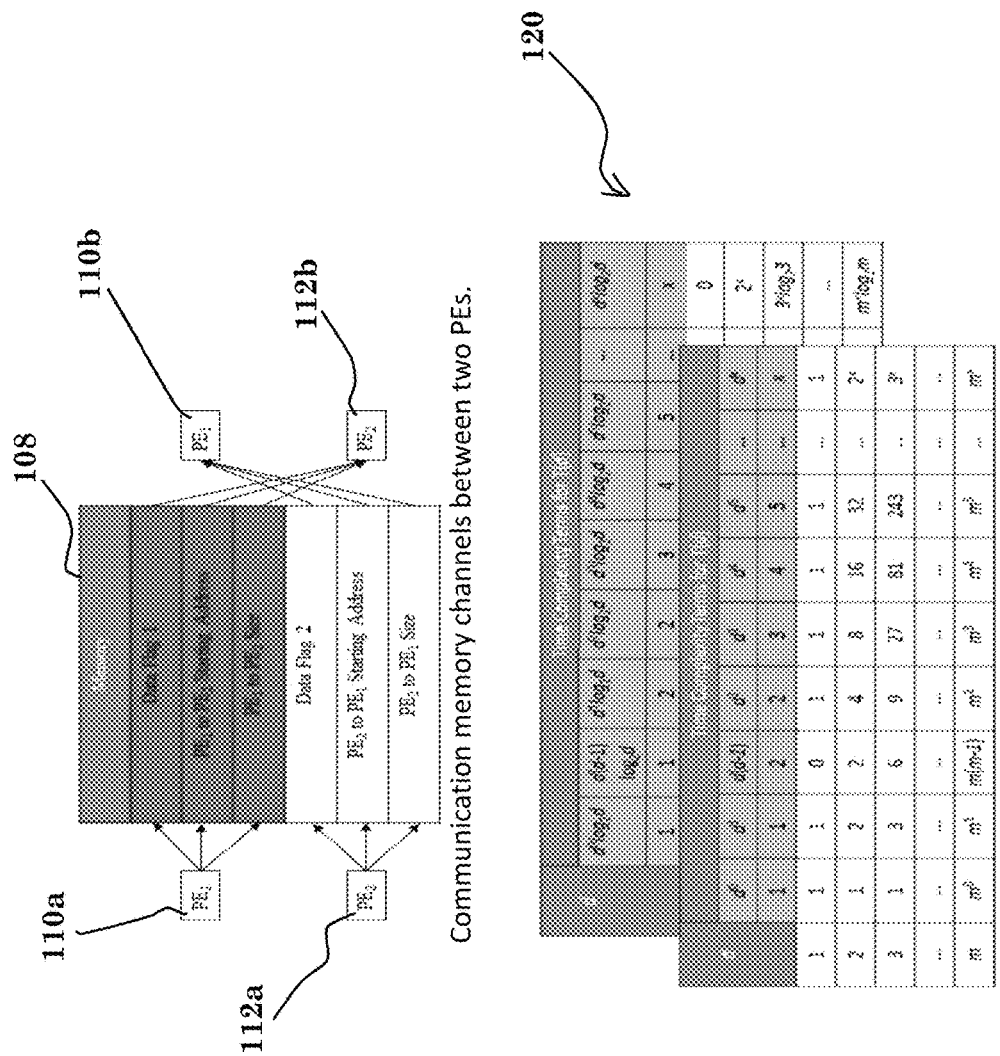
FIG. 5 shows exemplary communication memory channels between processing elements (PE), in accordance with embodiments of the present invention.

Referring to the channel depiction 108 of FIG. 5, flag 1 means data from $PE_1$. 110a has been transferred to $PE_2$ 112b. Flag 2 means data from $PE_2$ 112a has been transferred to $PE_1$110b. The $PE_1$-to-$PE_2$ data transfer block contains information generated by $PE_1$ and received by $PE_2$ while the $PE_2$-to-$PE_1$ data transfer block contains information generated by $PE_2$ and received by $PE_1$. The data transmission model is given as follows:

1. If Data Flag 1 is reset, data is transmitted from $PE_1$ to $PE_2$. Simultaneously, if Data Flag 2 is reset, data is transmitted from $PE_2$ to $PE_1$.
2. Data Flag 1 is set by $PE_1$ after data transmission is complete. Simultaneously, Data Flag 2 is set by $PE_2$ after data transmission is complete.
3. If Data Flag 1 is set, Data Flag 1 is reset by $PE_2$ after the data has been fully received. Simultaneously, if Data Flag 2 is set, Data Flag 2 is reset by $PE_1$ after the data has been fully received.

As long as $T_0(n)=c$ or the number of communication memory channels c=n(n−1) for this case, minimized overhead can be maintained. The communication model is detectable from $T_0(n)$ by mapping it to the model.

Finding Time Complexity Functions

Finding a TC function is equivalent to fitting the observed timings found for various dataset sizes to a curve formed by those observations. Because an algorithm's processing time can vary for a given dataset size, averaging a representative sample of datasets of the same size is required. In place of slower methods of curve fitting such as non-linear least-squares regression, the steps of the algorithm below curve fitting method uses a series of searches used to quickly find the non-linear curve fit of the observed timings to a TC function.

1. A list of OPTs varying only the scaled dataset size per PE is created (e.g., FIG. 17 steps 130e-130g).
2. This list of OPTs is then scaled with one as the smallest processing time, each corresponding to an ODS. Note: scaled OPTs must be rounded to the same accuracy as the scaled time complexity search table.
3. The scaled OPT list is compared to a table with ordered columns labeled with functions, each with an associated list of scaled calculated processing times (CPTs), again each corresponding to an ODS.
4. The associated CPT column function saved is the one with times closest to but still less than or equal to the times in the OPT list.
    a. A CPT column is invalid if the largest power of the column function is greater than the number of timings in the OPT column. Since the first search gives the highest power, having a sufficient number of timings can be determined.
    b. The associated times of the saved CPT column are subtracted from the scaled OPTs, creating a derived, scaled OPT list.
    c. Beginning with step 3, the process is repeated using the derived OPT list as the original OPT list.

5. Once no timing in a OPT list is greater than a timing in a CPT column, the process is complete.
6. The saved functions are summed together to give an approximation of the TC function T(d) as shown in equation (10) for $T_p(n)$.

If the final derived, scaled OPTs are all zeros, it is an exact match; otherwise, the actual TC function is greater than or equal to the TC function found using this method. Since the minimum scaled time is always one, T(1)=1.

Any number of columns headed by any continuous function can be created and used in the search. In order to place or insert a column between existing columns all values must be between the values of those columns. To make a column the largest, all of its values must be greater or equal to than the prior largest columns values. To make a column the smallest, all of its values must be less than the prior smallest columns values. If there is no location available for the new column, then a different search table must be created. It is possible to create separate, different search tables of like functions (function classes). Given more than one function class (for example, power functions and log functions), the classes can be processed in parallel if they are stored as either separate 2-dimensional tables or as separate "z" axis entries of a single 3-dimensional table. The correct function to be saved is found from a search of all functions in all classes. Note that in Table 4 the power of a column function is given in the row below each column header. The Table 7 columns of FIG. 6 must be ordered as the smallest to the largest term.

Because the columns are ordered it is possible to use a binary search to find the appropriate term. If all tables or z-axis entries are the same size, then the number of columns per table or z-axis entry, x, is the total number of columns, divided by the number of table or z-axis entries, z. Thus the maximum number of search steps per term, k, is given by:

$$k = \log_2\left(\frac{x}{z}\right) \quad (16)$$

Example: Finding Delaunay Time Complexity

Delaunay timings with different dataset sizes corresponding to different PE counts were recorded and scaled in Table 3.

The scaled OPTs associated with their scaled ODSs are compared to corresponding scaled CPTs in the table of FIG. 6.

TABLE 8

DELAUNAY SCALED TIME COMPARED TO COMPLEXITY SEARCH TABLE SCALED TIME

| Scaled Dataset Sizes | $d^2\log_2 d$ | Scaled Observed Timings | $d^3$ Scaled Timings |
|---|---|---|---|
| 1 | 0.000 | 1.000 | 1.000 |
| 2 | 4.000 | 6.479 | 8.000 |
| 4 | 32.000 | 53.491 | 64.000 |
| 8 | 192.000 | 418.334 | 512.00 |

The timing values of the CPT column saved, $d^2 \log_2 d$, are the closest to but still less than the OPTs, giving the first saved time complexity term as $d^2 \log_2 d$. Subtracting the $d^2$ $\log_2 d$ timing values from the corresponding OPTs gives a new OPT list. These new OPTs are then compared to the table of FIG. 6.

TABLE 9

1st DERVIED SCALED OBSERVED TIMINGS FOR DELAUNAY

| Scaled Dataset Sizes | d(d − 1) Scaled Timings | Scaled Observed Timings | $d^2$ Scaled Timings |
|---|---|---|---|
| 1 | 0.000 | 1.000 | 1.000 |
| 2 | 2.000 | 2.479 | 4.000 |
| 4 | 12.000 | 21.491 | 16.000 |
| 8 | 56.000 | 226.334 | 64.000 |

The next CPT column term saved is d(d−1), based on the same search criteria. The d(d−1) column time values are subtracted from the corresponding OPTs timing values, giving a new OPT list.

TABLE 10

2nd DERVIVED SCALED OBSERVED TIMINGS FOR DELAUNAY
Scaled Observed Timings

| |
|---|
| 1.000 |
| 0.479 |
| 9.491 |
| 120.334 |

Since there is no Table 7 (FIG. 6) column with timings that are consistently less than the new OPT list, the search is complete, giving T(d) @ $d^2 \log_2 d+d(d-1)$. With leftover timing values in the table, the interpretation is that the calculated TC is less than or equal to the actual TC.

Example—Finding Delaunay Overhead

Finding and processing the overhead for Delaunay triangulation requires the computational time complexity to be separated from the overhead time complexity. First, OPTs using a single PE varying only the dataset size are found. Next, the Delaunay is parallelized and OPTs using n PEs for the same dataset sizes per PE as used for the non-parallelized Delaunay are recorded. The OPTs from the non-parallelized Delaunay are subtracted from the analogous parallelized OPTs to give the overhead timings.

TABLE 11

DELAUNAY SCALED OVERHEAD TIME COMPARED TO COMPLEXITY SEARCH TABLE SCALED TIME

| Scaled Dataset Sizes | $\log_e(d)$ | Scaled Observed Timings | $\log_2(d)$ |
|---|---|---|---|
| 1 | 0.000 | 0.000 | 0.000 |
| 2 | 1.000 | 1.000 | 1.000 |
| 4 | 1.386 | 1.396 | 2.000 |
| 8 | 2.079 | 2.692 | 3.000 |

Using Table 7 of FIG. 6 and the method of the "Finding Timing Complexity Functions" Section of the present disclosure, $T_o(n)=\log_e(n)$ is found, from equation (4) we get $s_o=0$, therefore, from equation (14), the following is achieved:

$$S_{delaunay}(n) = \frac{n^2 \log_2(n) + n(n-1)}{\log_e(n)} \quad (17)$$

Scaler Time Complexity

The processing time of an algorithm can vary even if the dataset size stays the same. For example, the processing time of an algorithm using arbitrary precision math varies with the number of digits of accuracy, even though the input dataset size remains unchanged. If the input dataset size remains unchanged but the processing time varies with the value of an input scaler values, then replacing dataset size with the scaler value allows a time complexity to be calculated using the methods of Section "Finding Time Complexity Function" of the present disclosure. This scaler time complexity thus can be used in place standard time complexity throughout the present invention. The predictive power of scaler Time Complexity is shown in the "Strong Scaling Speedup" Section of the present disclosure for arbitrary precision $e^x$.

Serial Time Complexity

As was taught herein for equations (4) and (5), serialism is detected when the time complexity of an algorithm or any of its functional components is $\le d^0$. The constant time complexity for a particular serial functional component is shown as $T_{si}(d)$. The serial-time values $t_s$ of all $T_{si}(d)$ are summed. Both the observed time $t_{sp_j}$ remaining after analyzing the time complexity for each parallel component and the observed time $t_{so_k}$ remaining after analyzing overhead-time complexity are added to serial time. Serial-time complexity is represented by $C_s$:

$$T_{s_1}(d) + T_{s_2}(d) + \ldots + T_{s_x}(d) \Rightarrow C_s = \sum_{a=1}^{i} t_{s_a} + \sum_{b=1}^{j} t_{sp_b} + \sum_{c=1}^{k} t_{so_c} \quad (11)$$

Time Complexity Bounding Interval

The time-complexity behavior of an algorithm is a function of the type as well as the size of the input dataset. Different dataset types for an algorithm occur because there can exist multiple linearly independent pathways through the algorithm, as described by Thomas J. McCabe's "A Complexity Measure", IEEE Transactions on Software Engineering, 1976, pp. 308-320, which is fully incorporated herein by reference. Such a pathway is accessed based on the input-dataset values and represents a particular list of the algorithm's decomposed functional components. All datasets that use the same pathway represent the same dataset type. For each dataset type, both a minimum and a maximum performance time-complexity function exists, giving a closed time-complexity interval. That is, the predicted processing time for an algorithm with an arbitrary dataset within a pathway is bounded by this interval, formed by finding and processing the minimum and maximum T(d) using Table 3.

Space Complexity

Since an algorithm can contain multiple linearly independent pathways comprised of sequential functional components, it is possible for the output of one functional component to become the input of a subsequent component. The output-dataset size of each component varies by some function of the input-dataset size. Space complexity, this relationship between input-dataset size and the output-dataset size, can be found in a manner analogous to time complexity using $K_i(d)$ in place of the $T_x(d)$ and the calculated output-dataset size values in place of the calculated processing-time values in Table 3. For space complexity, the $d^0$ column in Table 3 indicates that the output- and input-dataset sizes are equal. $K_{i,h}(\ )$ represents the $h^{th}$ space-complexity term of $i^{th}$ functional component.

$$K_i(d) \cong K_{i,1}(d) + K_{i,2}(d) + \ldots + K_{i,h}(d) = \sum_{q=1}^{h} K_{i,q}(d) \quad (12)$$

where h=number of space-complexity terms.

Any observed dataset amount left over from analyzing and processing space complexity is added as a fixed additional dataset size to the space complexity of the component and is called $F_s$.

Software System—in Use

Figure 7:
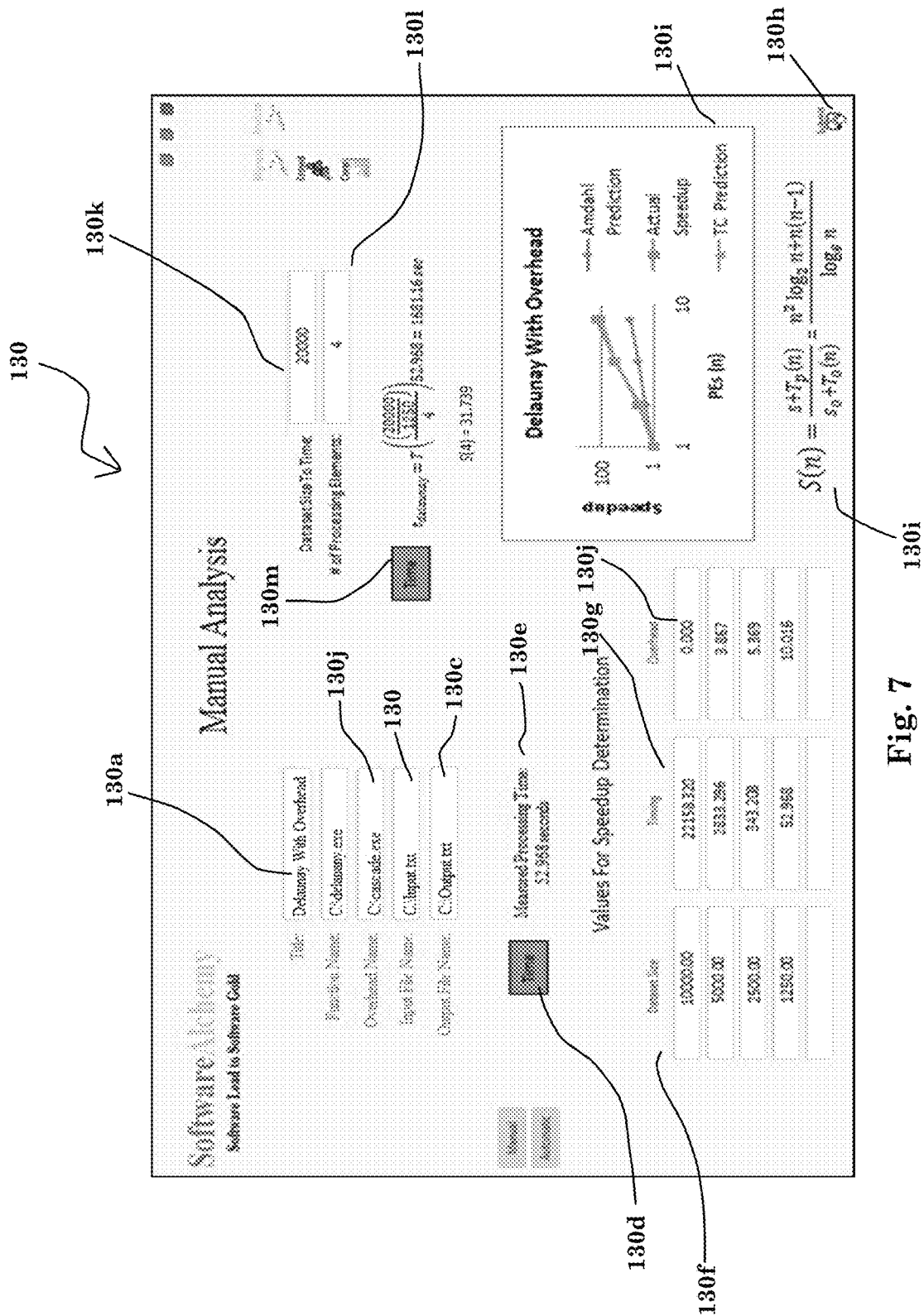
FIG. 7 shows a display output or screenshot of a manual analysis process, in accordance with embodiments of the present invention.

Referring to FIG. 7, a display output or screenshot 130 for an embodiment of the manual analysis processing of the present invention is shown. In general, the task of parallelizing a software functional component is considered much more difficult than its original coding. Because of this difficulty, being able to predict the effects of the parallelization on the component or system prior to performing the parallelization is ideal. The software, systems, and methods of the present invention provide an analysis of functional software components needed to: 1) determine if the component is inherently serial (cannot be parallelized) or will benefit from parallelization; 2) determine and process an estimate of the speedup obtainable for various numbers of processing elements if the functional component is parallelized; 3) determine and process an estimate of the processing time for a dataset of the given size using a given number of processing elements; 4) determine and process an estimate of the effects of overhead when a functional component can be parallelized; and 5) deliver or output this information in an easy-to-understand form.

A functional component is selected using a URL, or a like link or selection, to an executable version of the to-be-analyzed code, called the function name. Title information to be used to label the generated graph is entered at field 130a. The URL of a file containing the functional component input, called input function name, is entered at field 130b. Finally, the URL of a file that receives the output of functional component is entered at field 130c. The functional component is executed through the system of the present invention by selecting the associated TIME button 130d. The system both calculates the input dataset size and measures how long it takes to process the input dataset size in accordance with the processing steps and operations detailed herein. The dataset size of the correct input vector or matrix is known to the system by the user inputting a single instance of the symbol:

(SA-Dataset-Size ([Input matrix name|Input vector name]= ((value 1-1, value 1-2, . . . , value 1-n); (value 2-1, value 2-2, . . . , value 2-n); . . . ; (value n−1, value n−2, . . . , value n-n)))

Alternatively, the correct scaler value within the input file to be used is known by the user inputting a single instance of the symbol:

SA-Scaler (Input variable name=value)

The processing time value is then displayed at 130e. Double left-clicking, or by other selection methods, a row in the dataset size column causes the dataset size, or alternatively the scaler value, to display in region 130f. In addition, the processing time appears in the associated "Timing" row 130g. Changing the input file URL such that the dataset size is decreased, but using a smaller or larger version of the same data as before, the timing is repeat processed and the data placed in different rows or regions of the dataset size column 130f. Selecting a "Submit" or like input button 130h causes the speedup equation "S(n)= . . . " to be calculated in accordance with the computational processing steps and operations taught herein, and causes both the equation and a log-log graph of the speedup to be displayed at region 130i. The title of the graph will be the title entered. If the graph of 130i is a horizontal line, then the functional component is serial and cannot be parallelized. If the graph 130i decreases in value from left to right, then the functional component is effectively serial and will not benefit from parallelization. If the graph 130i increases from left to right, then it is parallelizable and will benefit from parallelization.

The overhead is primarily the effect of cross-communication. The URL of the to-be-analyzed cross-communication model is inputted in the overhead name field 130j at the same time that the function name URL is entered. The functional component and overhead cross-communication model are executed by selection of the associated TIME button. The system of the present invention processes and calculates the input dataset size, measures how long it takes to process the input dataset size, and measures how long it takes to process the cross-communication model. The processing and overhead (130j) time values are then displayed. Double left-clicking, or otherwise selecting, a row in the dataset size column causes the dataset size, or alternatively the scaler value, to appear in that row. In addition, the processing time is stored in the associated "Timing" row, while the overhead processing time is stored in the associated "Overhead" row.

Once a speedup equation has been created (with or without overhead), then the "dataset size to time" and "# of processing elements" fields 130k, 130l become active to receive input and/or data. Entering a dataset size (or alternatively some scaler value) plus a number of processing elements in the respective fields, and then selecting the associated TIME button 130m, causes the system of the present invention to estimate both the processing time for a dataset of the entered size using the given number of processing elements and the speedup from parallelization obtained using that number of processing elements.

Figure 8:
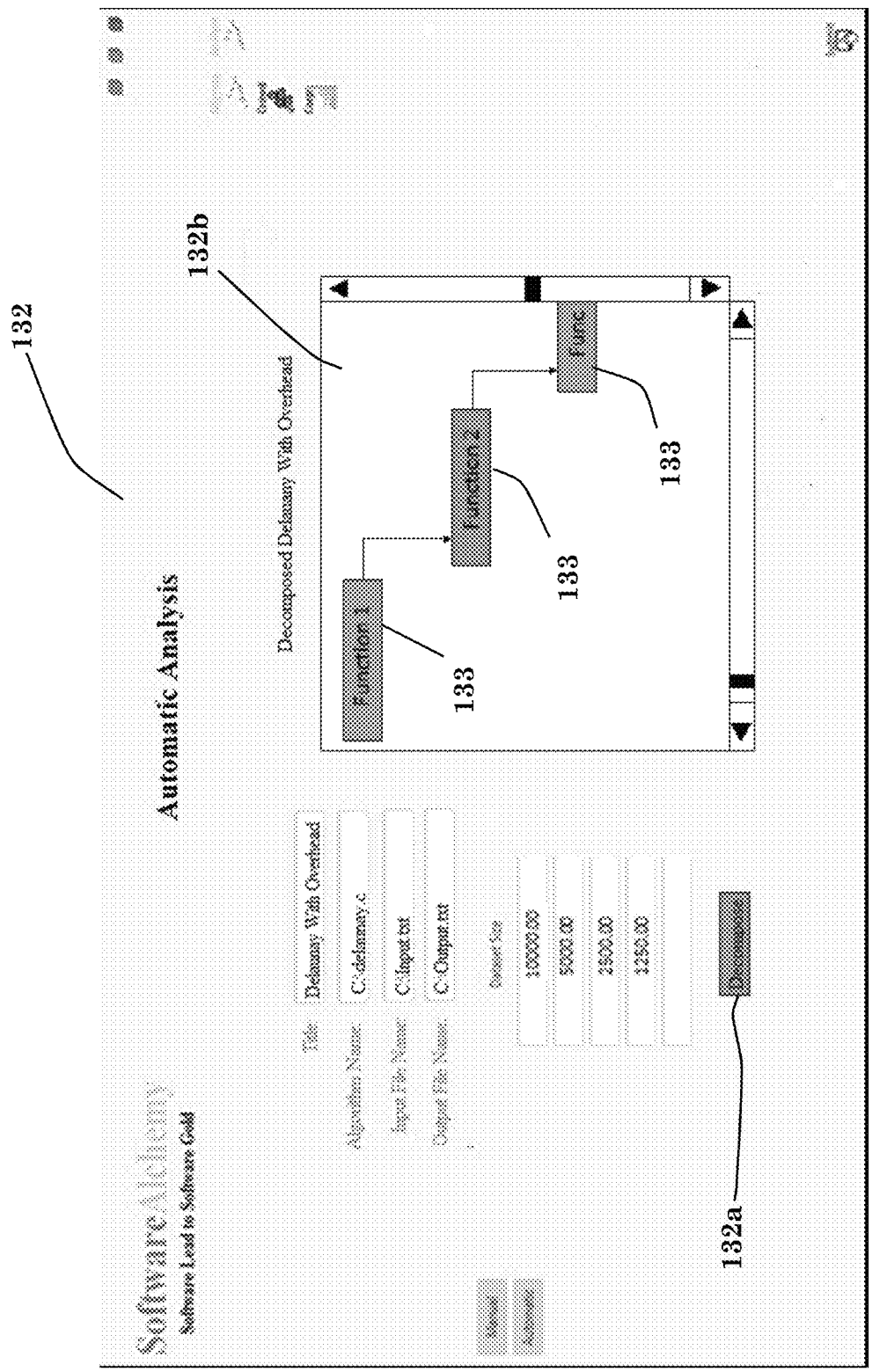
FIG. 8 shows a display output or screenshot of an automatic analysis process, in accordance with embodiments of the present invention.

Referring to FIG. 8, a display output or screenshot 132 for an embodiment of the automatic analysis processing of the present invention is shown. This automatic analysis embodiment allows an algorithm to be decomposed into linked functional components. The functional speedup and timings, without overhead, for each functional component is automatically created using the overall input dataset values given to or processed by the algorithm. Inputs of different sizes are entered in the same manner as for manual analysis of the individual functional components (see FIG. 7 details herein). Selection of the "Decompose" button or selection 132a will cause the software to process and decompose the algorithm, creating an executable file for each function. Each functional component is executed in the original order so that the proper input dataset (e.g., the output of some preceding functional component) is used. When decomposition and analysis are complete, a map of the linked functional components is displayed at region 132b. Selecting the functional component 133 (e.g., clicking on a highlighted function) in the map will cause that component's color to change to green (or change in another visually distinguishing manner) and a pop-up or like window or area showing the manual screen (e.g., FIG. 7) of the functional can be displayed. The manual screen will have the input, input dataset size, associated timing values, speedup function, and speedup graph automatically created, transferred, and displayed for use with the operations and steps of FIG. 7.

Figure 9:
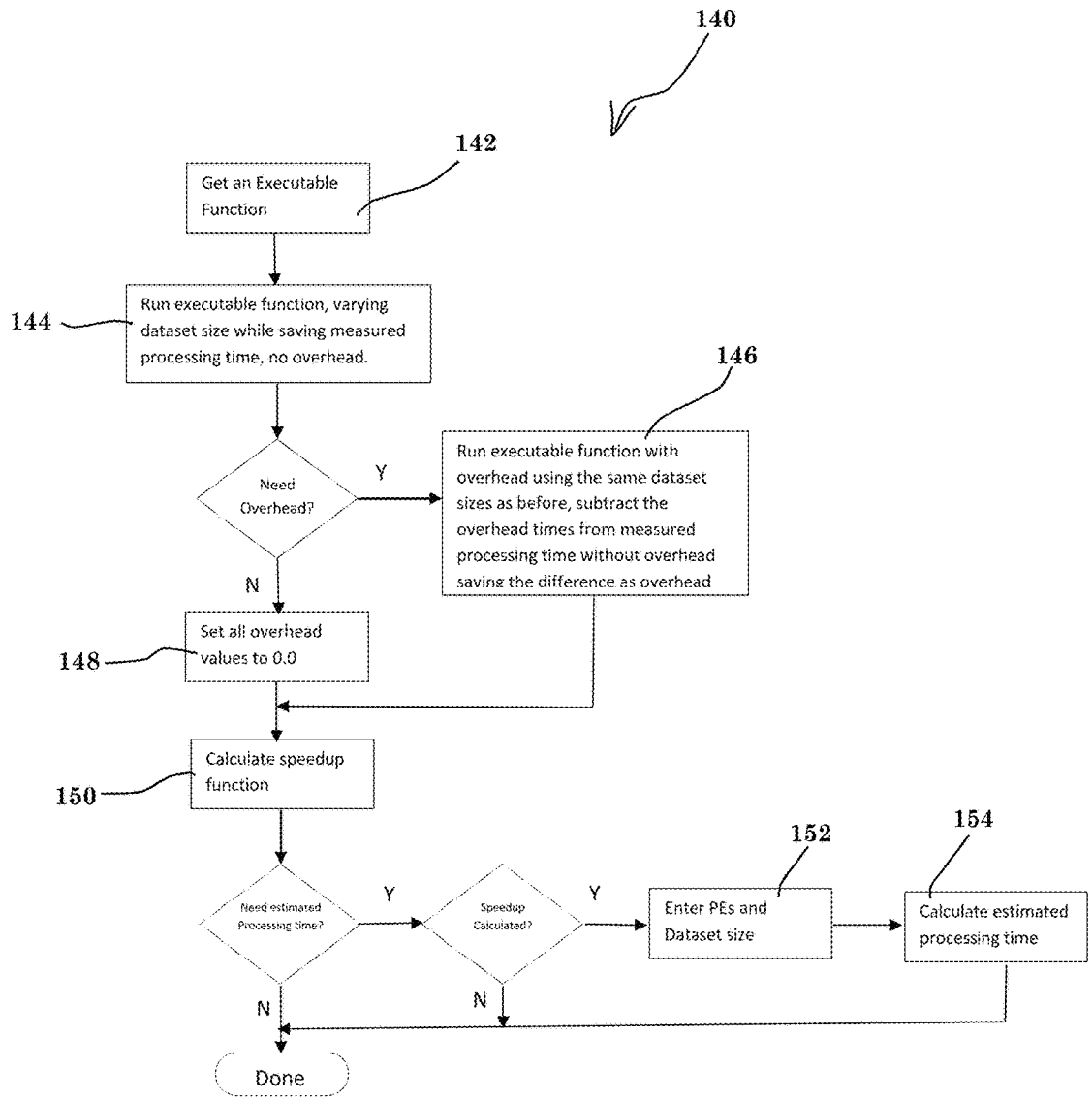
FIG. 9 is an operation and process flowchart for a predictive model creation system, in accordance with embodiments of the present invention.
Figure 10:
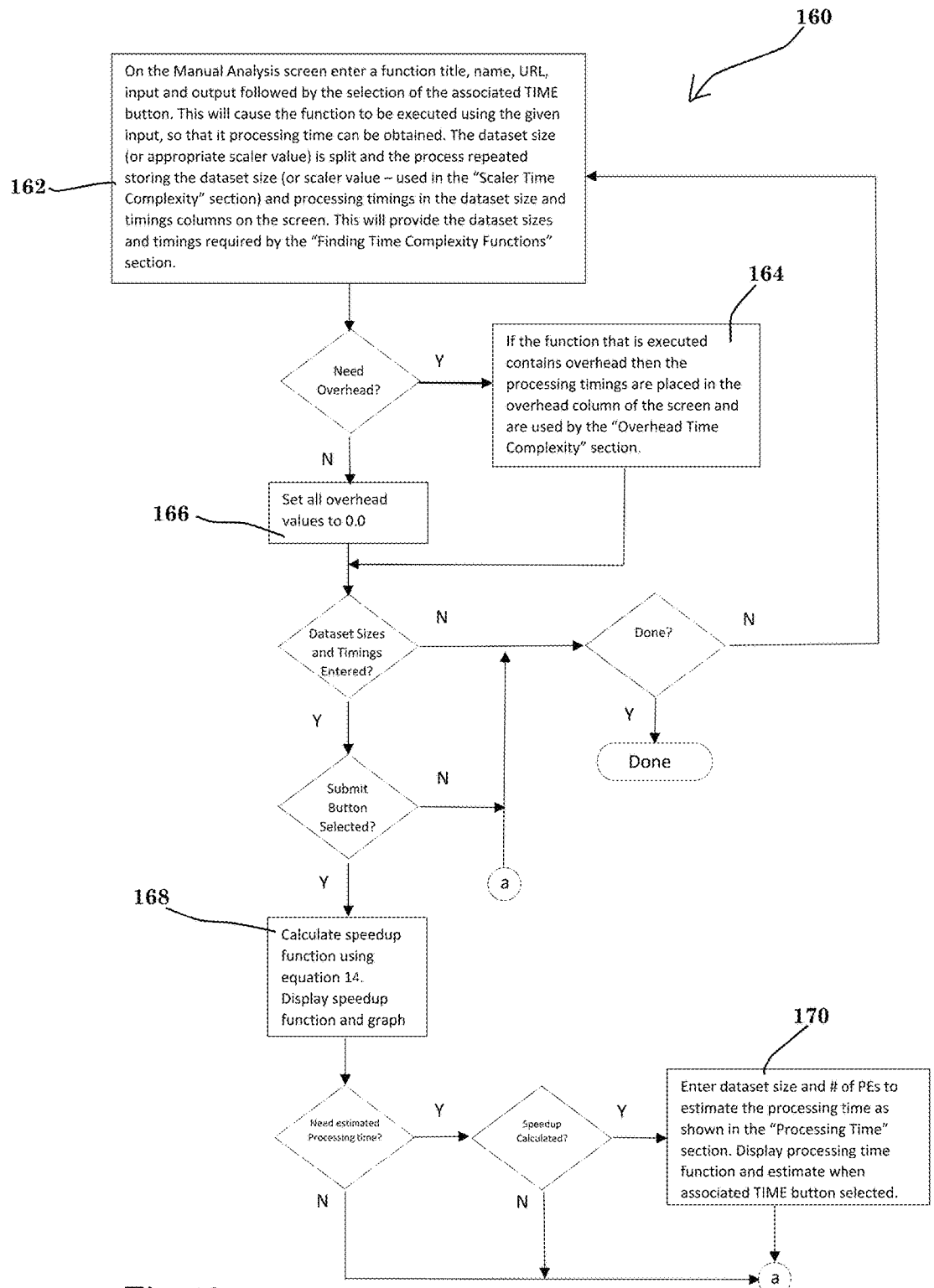
FIG. 10 is an operation and process flowchart for the manual analysis system of FIG. 7, in accordance with embodiments of the present invention.

Referring generally to FIGS. 9-10, flowcharts for the steps and operations of the present invention are further detailed.

FIG. 9 provides a general flowchart of the software system of the present invention, including receiving or getting an executable function at step 142, running the executable function (varying dataset size while saving measure processing time with no overhead) at step 144, and then determining whether overhead is needed. At step 142, Using the URL that has been entered into the system by a user on an input screen, the executable version (e.g., ".exe") of a functional component is initiated. Input dataset association occurs by the user entering a URL to a file containing the dataset. In certain embodiments, this is not a standard executable, but rather one that accepts input via a file (not a command line), and generates processing time as well as outputs which are stored in the file designated by the user defined URL. For step 144, selection of the "Time" button (again, see FIG. 7) will cause the system to perform an internal command line execution of the executable functional component. This execution can be invisible to the user unless the functional component requests additional information from the user, in which case a data entry pop-up display is shown to the user to capture that information via inputting. If overhead is needed, the executable function is run at step 146 with overhead using the same dataset sizes as initially or before, with the overhead times subtracted from the measured processing time without overhead—saving the difference as overhead. If the overhead timing fields have information entered into them, then overhead is considered when creating the speedup function. If no overhead is needed (e.g., all null), the overhead values are set to 0 so that the speedup function calculation does not throw an error.

Then, the speedup function is calculated at step 150 as described herein. Using the input dataset sizes and timings the dataset sizes are first scaled, then the scaled dataset sizes and associated timings are used to search for a polynomial that corresponds to the scaled sizes and timings. This search is repeated, finding a polynomial that corresponds to the scaled sizes and overhead timings. If estimated processing time is not needed, the process ends. If the processing estimate is needed, it is determined whether a speedup is to be calculated. If yes, then the PEs and dataset sizes are entered at step 152, and the estimated processing time is calculated at step 154. With step 152, when the user wants to know how long it will take to process a dataset on some number of processing elements and how much faster that is than if that dataset was processed using only a single processing element, the user need only enter the dataset size and number of proposed processing elements into the system. The system calculates the anticipated processing time and the anticipated speedup.

FIG. 10 provides the steps for the manual analysis process and operations (e.g., consistent with FIG. 7 teachings). Step 162 of the manual analysis process permit the user to enter a function title, name, URL, input and output fields, and the selection of the associated TIME button. This will cause the function to be executed using the given input, such that a processing time can be obtained. At step 164, if the executed function contains overhead, then the processing timings are placed in the overhead column of the displayed screen region and are used by the "Overhead Time Complexity" Section of the present disclosure. Again, all overhead values can be set to 0 if no overhead is needed, at step 166. At step 168, the speedup function is calculated using one or more equations taught and detailed herein (e.g., equation 14), and the speedup function and graph can be displayed. If a processing time and speedup are to be calculated, the user will enter the dataset size and the number of PEs at step 170 to estimate the processing time—as detailed in the "Processing Time" Section of the present disclosure. The processing time function and the estimate will be correspondingly displayed for the user when the associated TIME button is selected.

CONCLUSION

Arguably, one of the most important innovations of modern computing is the democratization of multi-processor/multi-core technology. Once only the domain of multi-million dollar government computer systems, this technology is now in almost every device, from cell phones, to laptop computers, to scientific and governmental computers. Billions of lines of code have already been written for millions of applications. Unfortunately, the vast majority of this code was written to run on only a single processor core. Thus, most software cannot take advantage of the current glut of processing power. This is because it is an estimated ten times harder to convert a code to run on multiple processors and cores than it is to write the original single processor code. Unfortunately, the results of this parallelization remain unknown until after the work is complete. Because of the effects of serialism and overhead, the results of converting the code to multi-processor use is generally disappointing.

The software systems and methods taught herein allow a user to first obtain processing timings for multiple dataset sizes for either a complete algorithm, or each functional component of a decomposed algorithm. The effort needed to obtain timings is relatively easy, especially compared to the effort of parallelization. Further, once a sufficient number of timings have been obtained (e.g., typically 3-5 timings), they are used to find a function that enables the prediction of how much faster a dataset can be processed on multiple processors/cores than a single processor/core. This is important because the effect of parallelization can be known prior to performing the work of parallelization. In addition, if the subject algorithm has been decomposed into its functional components, and a selection of the most promising components can be made and the parallelization process shared, decreasing the work of parallelization. The software system and method of the present invention also addresses the problem of overhead, which can greatly decrease the effect of parallelization. An overhead model can be selected prior to parallelization, and the overhead time from the processed and generated model determined and incorporated into the performance prediction. Finally, the present software system and method allows the user to mitigate the effect of overhead by selecting the number of virtual channels per processor core and minimize the processing time by matching the number of processor cores to the dataset size as described herein.

The present invention enables software consultants, major corporations, and others to use their vast software intellectual property to take advantage of modern hardware without the current risks it usually entails. It presents new opportunities in software life extension.

While various embodiments have been described above, it should be understood that they have been presented by way of example only, and not limitation. Thus, the breadth and scope of the present disclosure should not be limited by any of the above-described embodiments or examples. Moreover, any combination of the above-described elements in all possible variations thereof is encompassed by the disclosure unless otherwise indicated herein or otherwise clearly contradicted by context.

References to methods and steps such as inputting, entering, and the like can include manual user inputs, or direct generation and insertion/inclusion of data via software.

Additionally, while the methods described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method of parallel processing prediction for software, comprising:
    receiving a software algorithm;
    determining a plurality of execution pathway components for the software algorithm;
    determining a plurality of input workload attributes related to processing times of the plurality of execution pathway components;
    defining a plurality of initial input dataset values having one or more associated workload attributes based on the plurality of execution pathway components;
    defining a plurality of workload scaling factors to facilitate prediction of the processing times of the plurality of execution pathway components;
    defining a plurality of scaled processing time prediction functions based on the plurality of initial input dataset values for the plurality of execution pathway components
    defining a plurality of speedup prediction functions based on the plurality of scaled processing time prediction functions;
    dynamically scaling a plurality of current input dataset values based on the plurality of workload scaling factors; and
    outputting how many of a plurality of computer processing elements will be used based on the scaled plurality of current input dataset values.

2. The method of claim 1, further including processing and calculating the speedup of the software algorithm.

3. The method of claim 1, further including determining if one or more of the plurality of execution pathway components are serial components.

4. The method of claim 1, further including determining if one or more of the plurality of execution pathway components are parallel components.

5. The method of claim 1, further including determining if one or more of the plurality of execution pathway components are mixed serial and parallel components.

6. The method of claim 1, further including determining and flagging serial overhead of the software algorithm using time complexity.

7. The method of claim 1, wherein the plurality of computer processing elements includes a plurality of computer processor cores.

8. The method of claim 1, wherein the plurality of computer processing elements includes a plurality of computer processors.

9. A method of parallel computer processing prediction, comprising:
receiving a software algorithm;
determining a plurality of execution pathway components for the software algorithm;
determining a plurality of time scaling factors for the plurality of execution pathway components;
determining scaled workload prediction functions based on scaled workload timings for the plurality of execution pathway components;
dynamically scaling processing times based on the time scaling factors for the plurality of execution pathway components; and
determining input values for a plurality of computer processing elements based on the scaled processing times.

10. The method of claim 9, further including identifying a polynomial based on one or more scaled dataset sizes and timings.

11. The method of claim 9, further including determining if one or more of the plurality of execution pathway components are serial or parallel components.

12. The method of claim 9, further including determining and flagging overhead computing resources.

13. The method of claim 12, wherein the overhead computing resources includes computing memory.

14. The method of claim 12, wherein the overhead computing resources includes computing bandwidth.

15. The method of claim 9, wherein the plurality of computer processing elements includes a plurality of computer processor cores.

16. The method of claim 9, wherein the plurality of computer processing elements includes a plurality of computer processors.

* * * * *